United States Patent
Vos et al.

(10) Patent No.: US 9,144,066 B2
(45) Date of Patent: Sep. 22, 2015

(54) METHOD AND SYSTEM FOR HYBRID AUTOMATIC REPEAT REQUEST COMBINING ON AN LTE DOWNLINK CONTROL CHANNEL

(71) Applicant: Sierra Wireless, Inc., Richmond (CA)

(72) Inventors: Gustav Gerald Vos, Surry (CA); Ghasem Naddafzadeh Shirazi, Vancouver (CA); Lutz Hans-Joachim Lampe, Vancouver (CA); Ramon Khalona, Carlsbad, CA (US)

(73) Assignee: Sierra Wireless, Inc., Richmond (CA)

( * ) Notice: Subject to any disclaimer, the term of this patent is extended or adjusted under 35 U.S.C. 154(b) by 144 days.

(21) Appl. No.: 13/730,244

(22) Filed: Dec. 28, 2012

(65) Prior Publication Data

US 2014/0185534 A1    Jul. 3, 2014

(51) Int. Cl.
*H04W 4/00* (2009.01)
*H04W 72/04* (2009.01)
*H04L 1/16* (2006.01)
*H04L 1/18* (2006.01)

(52) U.S. Cl.
CPC ............ *H04W 72/042* (2013.01); *H04L 1/1657* (2013.01); *H04L 1/1819* (2013.01); *H04L 1/1845* (2013.01)

(58) Field of Classification Search
None
See application file for complete search history.

(56) References Cited

U.S. PATENT DOCUMENTS

| | | | |
|---|---|---|---|
| 7,729,346 B2 | 6/2010 | Lee et al. | |
| 2008/0002688 A1* | 1/2008 | Kim et al. | 370/389 |
| 2011/0141878 A1 | 6/2011 | Che et al. | |
| 2011/0141952 A1 | 6/2011 | Wang et al. | |
| 2011/0237283 A1 | 9/2011 | Shan et al. | |
| 2012/0202512 A1* | 8/2012 | Braithwaite | 455/452.2 |
| 2013/0223307 A1* | 8/2013 | Ohlsson et al. | 370/311 |
| 2013/0223485 A1* | 8/2013 | Bai et al. | 375/219 |
| 2014/0335876 A1 | 11/2014 | Ratasuk et al. | |
| 2014/0362832 A1 | 12/2014 | Rudolf et al. | |

FOREIGN PATENT DOCUMENTS

| | | |
|---|---|---|
| EP | 1 638 278 A2 | 3/2006 |
| WO | WO 2008/024158 | 2/2008 |
| WO | WO 2010/052537 | 5/2010 |
| WO | WO 2010/111428 | 9/2010 |
| WO | WO 2011/123809 | 10/2011 |

OTHER PUBLICATIONS

LTE MAC Scheduler and Radio Resource Scheduling. http://books.google.ca/books/about/LTE_The_UMTS_Long_Term_Evolution.html?id=E2ppetS3D7cC8K redir_esc=y.

(Continued)

*Primary Examiner* — Kodzovi Acolatse
(74) *Attorney, Agent, or Firm* — DLA Piper LLP (US)

(57) ABSTRACT

The present technology provides for an LTE system comprising a UE which is configured to perform blind HARQ combining of PDCCH messages, and an eNB which is configured with a HARQ transmission mechanism for such PDCCH messages. The PDCCH messages may be uplink or downlink grant messages, for example. In some embodiments, up to 8 messages may be combined via HARQ. Such HARQ combining may facilitate realizing a practical coverage gain.

18 Claims, 3 Drawing Sheets

(56) References Cited

OTHER PUBLICATIONS

Chapter 2 of "LTE—The UMTS Long Term Evolution: From Theory to Practice," 2nd Edition, S. Sesia, I. Toufik, M. Baker, Wiley, 2011.
3GPP TDoc R2-072630, HARQ Operation in case of UL Power Limitation; Ericsson, Jun. 2007.
3GPP RP-121441 "Updated SID on: Provision of low-cost MTC UEs based on LTE" (TSG RAN meeting #57, Chicago, USA, Sep. 2012).
U.S. Appl. No. 13/956,008, filed Jun. 31, 2013, Related Application.
International Serarch Report regarding PCT/CA2014/050677.

* cited by examiner

METHOD AND SYSTEM FOR HYBRID AUTOMATIC REPEAT REQUEST COMBINING ON AN LTE DOWNLINK CONTROL CHANNEL

FIELD OF THE TECHNOLOGY

The present technology pertains in general to error control in wireless communications and in particular to the use of hybrid automatic repeat request (HARQ) within downlink control channels such as the physical downlink control channel (PDCCH) of Long Term Evolution (LTE) communication systems.

BACKGROUND

Improved coverage in wireless communication systems such as Third Generation Partnership Project (3GPP™) LTE is sought after for various reasons. Coverage improvements may call for an increase in practical gain of various physical channels such as the PDCCH.

For example, a 3GPP™ work item entitled "Study on Provision of low-cost MTC UEs based on LTE," RP-121441, September 2012, sets forth a requirement for a new ultra high coverage mode for LTE with +20 dB of coverage. This may require up to 9 dB of practical gain for the PDCCH, provided in a dynamic way. More gain may be possible at the cost of additional memory and processing at the user equipment (UE).

One method for providing additional gain on channels such as the PDCCH is to increase the aggregation level (AL), which corresponds to the number of resources allocated to a control message. The current maximum AL in LTE is 8 control channel elements (CCEs). Even if the AL is increased to 32 CCEs, it is expected that this would contribute only 6 dB of gain for the PDCCH. Aggregation beyond 32 CCEs is problematic since it leads to an exponential increase in blind decoding options for the UE. Additionally, for bandwidth-constrained systems high levels of aggregation may not be feasible. For example, in a typical deployment scenario with a 10 MHz system bandwidth, a sub-slot is only capable of accommodating 55 CCEs, so the next aggregation level of 64 CCEs is not feasible.

Another potential approach is to dynamically increase the power of the CCEs for UEs which are in limited coverage situations. However, this solution currently provides only about 5 dB of coverage gain before spatial re-use problems arise.

As described for example in Chapter 2 of "LTE—The UMTS Long Term Evolution: From Theory to Practice," $2^{nd}$ Edition, S. Sesia, I. Toufik, M. Baker, Wiley, 2011, the concept of blind HARQ combining has been proposed for broadcasted system information blocks sent on the physical downlink shared channel (PDSCH) of an LTE system. However, in this case the PDCCH is used to indicate the location of repeated data within a sliding window.

Therefore there is a need for a method and system for implementing HARQ on an LTE downlink control channel that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method and system for hybrid automatic repeat request combining on an LTE downlink control channel. In accordance with an aspect of the present technology, there is provided a method for facilitating communication between an Evolved Node B (eNB) and a user equipment (UE) in a Long Term Evolution (LTE) system, the method comprising: transmitting a downlink control message from the eNB to the UE over the downlink control channel; retransmitting one or more copies of the downlink control message from the eNB to the UE over the downlink control channel in accordance with a determined downlink control message decoding status of the UE; receiving and storing the transmitted downlink control message and the retransmitted one or more copies of the downlink control message at the UE; and decoding using a combination of at least some of the transmitted downlink control message and the retransmitted one or more copies of the downlink control message at the UE.

In accordance with another aspect of the present technology, there is provided a system comprising an Evolved Node B (eNB) and a user equipment (UE) in a Long Term Evolution (LTE) system, wherein the system is configured to: transmit a downlink control message from the eNB to the UE over a downlink control channel; retransmit one or more copies of the downlink control message from the eNB to the UE over the downlink control channel in accordance with a determined downlink control message decoding status of the UE; receive and store the transmitted downlink control message and the retransmitted one or more copies of the downlink control message at the UE; and decode using a combination of at least some of the transmitted downlink control message and the retransmitted one or more copies of the downlink control message at the UE.

In accordance with another aspect of the present technology, there is provided a computer program product comprising a computer readable medium storing computer executable statements and instructions thereon that, when executed by a computer, perform operations for facilitating communication between an Evolved Node B (eNB) and a user equipment (UE) in a Long Term Evolution (LTE) system, the operations comprising: transmitting a downlink control message from the eNB to the UE over the downlink control channel; retransmitting one or more copies of the downlink control message from the eNB to the UE over the downlink control channel in accordance with a determined downlink control message decoding status of the UE; receiving and storing the transmitted downlink control message and the retransmitted one or more copies of the downlink control message at the UE; and decoding using a combination of at least some of the transmitted downlink control message and the retransmitted one or more copies of the downlink control message at the UE.

BRIEF DESCRIPTION OF THE FIGURES

These and other features of the technology will become more apparent in the following detailed description in which reference is made to the appended drawings.

DETAILED DESCRIPTION OF THE TECHNOLOGY

Definitions

Figure 1:
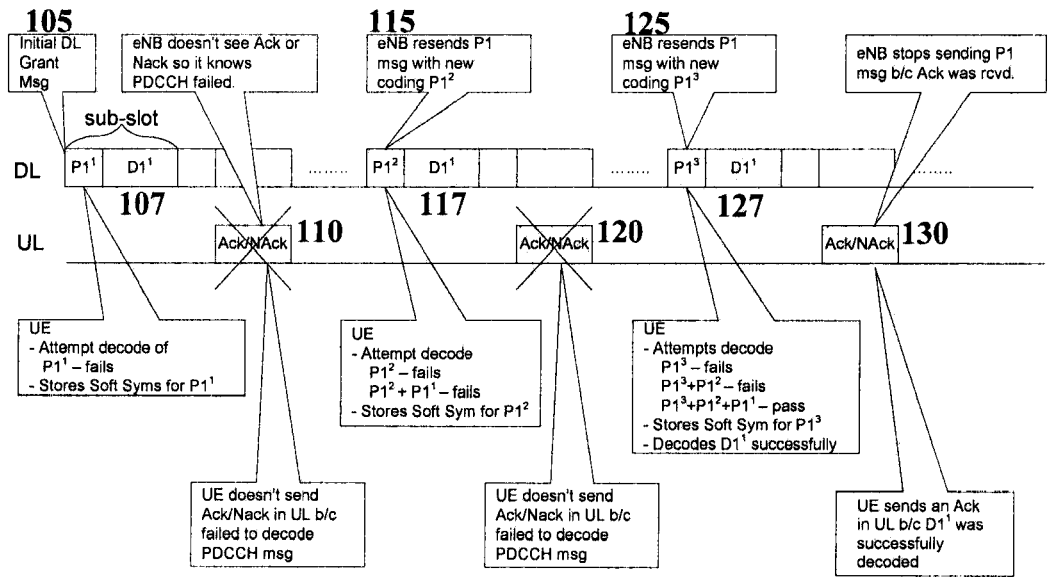
FIG. 1 illustrates transmission of a DL grant using blind combining HARQ, in accordance with one embodiment of the technology.

Unless defined otherwise, all technical and scientific terms used herein have the same meaning as commonly understood by one of ordinary skill in the art to which this technology belongs.

The present technology provides for an LTE system comprising a UE which is configured to perform blind HARQ combining of downlink control messages, and an eNB which is configured with a HARQ transmission mechanism for such messages. The downlink control messages may be PDCCH messages or Downlink Control Information (DCI) messages, uplink or downlink resource assignment messages or transmit power control messages, for example. In some embodiments, up to 8 downlink control messages may be combined. Such combining may facilitate realizing a practical coverage gain, for example a 9 dB gain on the PDCCH.

In accordance with an aspect of the present technology, there is provided a method for facilitating communication between an eNB and a UE in an LTE system. The method comprises transmitting a downlink control message from the eNB to the UE over the PDCCH. The method further comprises retransmitting one or more copies of the downlink control message from the eNB to the UE over the PDCCH in accordance with a HARQ mechanism. In some embodiments, retransmission occurs only if an acknowledgement (positive or negative) from the UE is not received by the eNB, and retransmission may occur up to a predetermined number of times. The acknowledgement or negative acknowledgement may be transmitted due to an existing mechanism within the LTE standard. In some embodiments, at least a predetermined number of retransmissions occur automatically. For example, various methods may be used to cause the UE to wait until a predetermined number of copies of the downlink control message are received before successfully combining and decoding the message. As an example, the copies of the grant downlink control message may be encoded in such a way that the UE cannot decode the downlink control message until the predetermined number of retransmissions has been received. However, with this example it may be desired to take measures to ensure the code is not overly weakened. The method further comprises receiving and storing the transmitted downlink control message and the retransmitted one or more copies of the downlink control message at the UE. The method further comprises decoding a combination of at least some of the transmitted downlink control message and the retransmitted one or more copies of the downlink control message at the UE.

In accordance with an aspect of the present technology, there is provided a system comprising an eNB and a UE in an LTE system. The system is configured to transmit a downlink control message from the eNB to the UE over the PDCCH. The system is further configured to retransmit one or more copies of the downlink control message from the eNB to the UE over the PDCCH in accordance with a blind combining HARQ mechanism. In blind combining HARQ, the UE may not have a priori knowledge of which messages to combine together, so trial message combining is performed blindly. The system is further configured to receive and store the transmitted downlink control message and the retransmitted one or more copies of the downlink control message at the UE. The system is further configured to blindly decode several different combinations of at least some of the transmitted downlink control message and the retransmitted one or more copies of the downlink control message at the UE. By attempting different combinations of messages, the UE may seek to obtain a decodable version of the message. A number of extra combination operations may be required by the UE in order to obtain such a decodable version.

The system may comprise substantially standard eNB and UE hardware, for example as found in LTE systems, and the system is further configured through firmware and/or software in order to implement the HARQ mechanism as described herein. The UE may further comprise additional memory for storing soft symbols from previously received messages for message combining. The eNB may comprise a sender HARQ module configured to encode messages for transmission and retransmission, monitor for acknowledgements (ACK) and/or negative acknowledgements (NACK), and trigger message transmission and retransmission as appropriate. The UE may comprise a receiver HARQ module configured to receive transmitted and retransmitted messages, combine and decode same, and transmit acknowledgements and/or negative acknowledgements as appropriate.

In some embodiments, the UE is configured to perform combining of additional message components such as physical downlink shared channel (PDSCH) messages. The eNB may be correspondingly configured with an HARQ transmission mechanism for such PDSCH messages.

In various embodiments, the aggregation level (AL) may be fixed to a predetermined value, for example via radio resource control (RRC) signalling. For example, aggregation levels in accordance with some embodiments of the present technology are 1, 2, 4 and 8. In some embodiments, higher aggregation levels such as 16 or 32 may be assigned depending upon availability. Limiting AL may advantageously limit the blind decoding options at the UE and hence manage complexity considerations.

In various embodiments, the UE may be configured to perform blind HARQ combining of downlink control (e.g. PDCCH) messages substantially without requiring or using additional HARQ signalling. This represents an advantage over methods which require such additional signalling.

In some embodiments, a blind combining HARQ mechanism is employed on the PDCCH, in which no additional signalling (beyond that already used for PDSCH HARQ, e.g. PDSCH ACKs/NACKs) is required. This is in contrast to physical uplink shared channel (PUSCH) HARQ, where the physical hybrid automatic repeat request indicator channel (PHICH) carries the HARQ ACK/NACK, which indicates whether the eNB has correctly received a transmission on the PUSCH, and where DL messages (PDSCH) HARQ ACK/NACKs are sent in PUSCH/PUCCH.

In various embodiments, a UE may be configured to store at least one set of previously received downlink control message signal components as soft symbols. The soft symbols of plural downlink control messages may then be used for blind combining. This may increase memory usage at the UE. In some embodiments, existing PDSCH/PUSCH HARQ memory may be re-used for storing downlink control messages.

In some embodiments, a UE may be configured to perform multiple (for example, 2, 3, 4, 5 etc) decoding operations per subframe. Blind combining on the PDCCH may also be performed in addition to multiple, possibly blind decoding. A decoding operation may comprise combining the symbols of a currently received downlink control message with stored PDCCH soft symbols in order to facilitate error correction. Multiple decoding operations may require increased processing. However, limiting to one AL and limiting combining to for example, whole powers of two for the blind combining options (e.g. 8, 4, 2, 1 instead of 8, 7, 6, 5, 4, 3, 2, 1) will limit blind decoding options. For example, the total number of blind decoding options could be reduced to 36 (1 AL level*2 DCI messages*3 DCI (downlink control information) formats*6 DCI combining combinations). Only the maximum of AL=31 would be used when the UE is in bad coverage even when it might need gain of 32 or more. As such, smaller AL levels would not be used. The UE and common search space would only have one possible DCI message each given the large AL, as this is likely all that would fit in the band. Three possible downlink control information (DCI) formats are normally possible currently but this level could be reduced. The 6 DCI message combining options could be 1, 2, 4, 8, 16 and 32.

In various embodiments, blind decoding may be required since the eNB can encode a downlink control (e.g. PDCCH DCI) message with different AL levels and DCI formats. The size of the search spaces (UE or common) also influences the number of blind decoding options. Considering the above, a Release 8/9 UE may be required to carry out a maximum of 44 blind decoding operations in a given subframe (12 in the common search space and 32 in the UE-specific search space).

In various embodiments, the eNB is configured with a mechanism to determine when decoding of a downlink control message has failed at a given UE, and to determine whether to transmit another copy of the downlink control message for combining at the UE. In some embodiments, for downlink grants, the presence of an UL ACK/NACK for the PDSCH may be used to indicate that the downlink control message was decoded correctly. In some embodiments, for uplink grants, the presence of UE transmitted energy on the PUSCH in the allocated physical resource block (PRB) may be used to indicate that the downlink control message was decoded correctly.

In various embodiments, downlink control message copies are coded to facilitate combining by the UE. For example, an initial copy of a downlink control message may be channel coded in a first manner, while subsequent copies of the downlink control message transmitted in accordance with HARQ may be channel coded in a different manner. This can facilitate soft combining of plural downlink control messages, for example with incremental redundancy, in order to increase the chance of successful decoding. The plural received copies of the downlink control message may be stored and combined by the UE, with decoding attempted on the combination of plural messages. Similar soft combining and/or incremental redundancy may be performed for PDSCH messages.

An example of incremental redundancy HARQ comes from HSDPA: the data block is first coded with a punctured ⅓ Turbo code, then during each (re)transmission the coded block is usually punctured differently (i.e. only a fraction of the coded bits are chosen) and sent.

In various embodiments, downlink control message copies are placed in locations (for example in time and frequency) that are known to the UEs so that UEs can blindly combine them. This may involve explicit or implicit transmission scheduling.

In some embodiments, transmission scheduling may be based on sub-frame numbers 0-9 and the system frame numbers. In some embodiments, based on an identifier of a UE (e.g. IMEI or IMSI Hash), the UE would know which sub-frames and system frame numbers the DCI messages would be sent on. In one embodiment, these are spaced at least 6 sub frames apart to allow the ACK/NACK or PUSCH to start and be detected by eNB. The UE may also be provided with information regarding which Physical Resource Block (PRB) is being used for a DCI message. This information may again be a hash of a UE ID or alternatively the UE and Common search spaces may be restricted in size to facilitate a practical small number of possible PRBs where the DCI message would be sent.

In some embodiments, the present technology may facilitate dynamic gain via HARQ. In some embodiments, the eNB may use conservative estimates for the required PDCCH coding rates. This may lead to more efficient use of PDCCH resources.

In some embodiments, the present technology may utilize fewer PDCCH resources in a subframe relative to other existing solutions. It is noted that 32 control channel elements (CCEs) may correspond to more than half of the PDCCH resources in a 10 MHz channel.

It is noted that implementations in accordance with the present technology may result in increased PDCCH latency, increased UE memory usage, increased UE processing requirements, or a combination thereof.

The technology will now be described with reference to specific examples. It will be understood that the following examples are intended to describe embodiments of the technology and are not intended to limit the technology in any way.

EXAMPLES

Example 1

FIG. 1 illustrates an example of a downlink (DL) grant (such as a downlink shared channel resource allocation) being communicated to a UE in accordance with an embodiment of the present technology. Due to two failed decoding attempts, the DL grant message is transmitted three times on the PDCCH, as follows. The eNB transmits an initial DCI message $P1^1$ 105 to the UE over the PDCCH, as well as an initial user plane message $D1^1$ 107 to the UE over the PDSCH. (The message $D1^1$ may contain user plane data or higher-level signalling control data, e.g. RRC or NAS control data.). In the present example, the UE attempts to decode $P1^1$ 105 but fails. The UE therefore stores the soft symbols for $P1^1$ 105.

The failure by the UE to decode $P1^1$ 105 results in the UE also not attempting to decode the PDSCH. As a result, an acknowledgement or negative acknowledgement 110 is not sent for the PDSCH message.

The eNB, failing to receive an acknowledgement or negative acknowledgement 110 within an expected time range, infers that the UE has failed to decode $P1^1$ 105. A second attempt follows. The eNB transmits another message $P1^2$ 115 to the UE over the PDCCH, as well as another copy of message $D1^1$ 117 to the UE over the PDSCH. The two messages $P1^2$ 115 and $D1^1$ 117 are again transmitted in the same subslot. The message $P1^2$ 115 may be encoded differently than the message $P1^1$ 105, in order that the subsequent combination of messages corresponds to more than a simple repetition code. In the present example, the UE attempts to decode $P1^2$ 115 but fails. Additionally, the UE combines the messages $P1^1$ 105 and $P1^2$ 115 and attempts to decode the combination, but decoding of the combination also fails. The UE therefore stores the soft symbols for $P1^2$ 115 and refrains from sending an acknowledgement or negative acknowledgement 120 via the uplink channel.

Once more, the eNB, failing to receive an acknowledgement or negative acknowledgement 120 within an expected time range, infers that the UE has failed to decode P1$^1$ 105 and P1$^2$ 115. A third attempt follows. The eNB transmits another message P1$^3$ 125 to the UE over the PDCCH, as well as another copy of message D1$^1$ 127 to the UE over the PDSCH. The two messages P1$^3$ 125 and D1$^1$ 127 are again transmitted in the same sub-slot. The message P1$^3$ 125 may be encoded differently than the messages P1$^1$ 105 and P1$^2$ 115, in order that the subsequent combination of messages corresponds to more than a simple repetition code. In the present example, the UE attempts to decode P1$^3$ 125 but fails. Additionally, the UE combines the messages P1$^2$ 115 and P1$^3$ 125 and attempts to decode the combination, but decoding of the combination also fails. Finally, the UE combines the messages P1$^1$ 105, P1$^2$ 115 and P1$^3$ 125 and successfully decodes the combination. The UE then tries to decode D1$^1$ and transmits an acknowledgement or NACK 130 via the uplink channel indicating the decoding status of D1$^1$. The eNB receives the acknowledgement or NACK 130 and knows that the DL grant was received and whether or not the user plane message was decoded. The acknowledgement or NACK 130 corresponds to the existing acknowledgement or negative acknowledgement that is normally sent, in accordance with the existing LTE specification. That is, the ACK or NACK is not in addition to the existing specified ACK or NACK. If a NACK is transmitted, the existing PDSCH HARQ procedure is invoked.

In some embodiments, to control memory usage, the PDSCH resource (e.g. D1) may be sent on a limited subset of PRBs within the band.

Example 2

Figure 2:
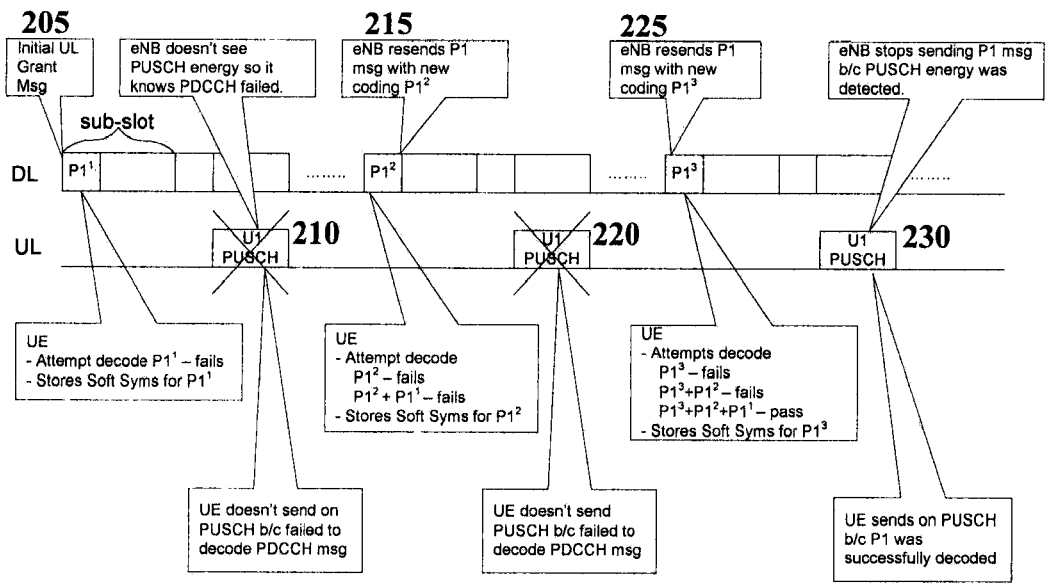
FIG. 2 illustrates transmission of an UL grant using blind combining HARQ, in accordance with one embodiment of the technology.

FIG. 2 illustrates an example of an uplink (UL) grant (such as an uplink shared channel resource allocation) being communicated to a UE in accordance with an embodiment of the present technology. Due to two failed decoding attempts, the UL grant message is transmitted three times on the PDCCH, as follows. The eNB transmits an initial DCI message P1$^1$ 205 to the UE over the PDCCH. In the present example, the UE attempts to decode P1$^1$ 205 but fails. The UE therefore stores the soft symbols for P1$^1$ 205 and refrains from sending data on the uplink channel (for example the PUSCH). In the UL case no ACK/NACKs are sent; only data is sent on the UL data channel, the PUSCH.

The eNB, failing to see energy or decode U 1 on the PUSCH 210 within an expected time range, infers that the UE has failed to decode P1$^1$ 205. A second attempt follows. The eNB transmits another DCI message P1$^2$ 215 to the UE over the PDCCH. The message P1$^2$ 215 may be encoded differently than the message P1$^1$ 205, in order that the subsequent combination of messages corresponds to more than a simple repetition code. In the present example, the UE attempts to decode P1$^2$ 215 but fails. Additionally, the UE combines the messages P1$^1$ 205 and P1$^2$ 215 and attempts to decode the combination, but decoding of the combination also fails. The UE therefore stores the soft symbols for P1$^2$ 215. Detecting energy in the PRB that was designated by the DCI UL grant is one way by which the eNB may detect if the UL grant was correctly decoded by the UE.

Once more, the eNB, failing to see energy or decode U1 on the PUSCH 220 within an expected time range, infers that the UE has failed to decode P1$^1$ 205 and P1$^2$ 215. A third attempt follows. The eNB transmits another message P1$^3$ 225 to the UE over the PDCCH. The message P1$^3$ 225 may be encoded differently than the messages P1$^1$ 205 and P1$^2$ 215, in order that the subsequent combination of messages corresponds to more than a simple repetition code. In the present example, the UE attempts to decode P1$^3$ 225 but fails. Additionally, the UE combines the messages P1$^2$ 215 and P1$^3$ 225 and attempts to decode the combination, but decoding of the combination also fails. Finally, the UE combines the messages P1$^1$ 205, P1$^2$ 215 and P1$^3$ 225 and successfully decode the combination. The UE transmits the UL data 230 via the uplink channel. The eNB receives the UL data 230 and stops sending copies of the UL grant message.

Example 3

In Example 1, the same message D1$^1$ is transmitted three times. This may correspond to a waste of PDSCH resources when the UE is not able to decode the PDCCH downlink grant. To avoid wasting these PDSCH resources, the UE may be configured to also store the PDSCH soft symbols and combine them when the PDCCH has been successfully decoded. In some embodiments, the message D1$^1$ may be encoded differently on each transmission attempt in order to facilitate efficient combining.

Figure 3:
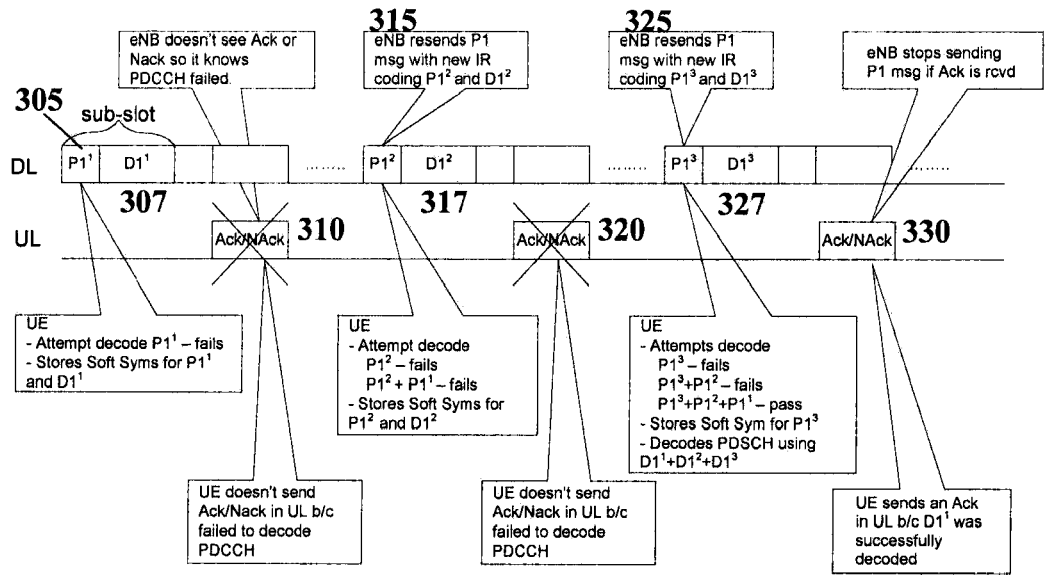
FIG. 3 illustrates transmission of a DL grant using blind combining HARQ along with PDSCH combining, in accordance with one embodiment of the technology.

FIG. 3 illustrates an example of a downlink (DL) grant (such as a downlink shared channel resource allocation) being communicated to a UE in accordance with an embodiment of the present technology. Due to two failed decoding attempts, the DL grant message is transmitted three times on the PDCCH, as follows. The eNB transmits an initial message P1$^1$ 305 to the UE over the PDCCH, as well as an initial message D1$^1$ 307 to the UE over the PDSCH. The two messages P1$^1$ 305 and D1$^1$ 307 are transmitted in the same sub-slot as in Example 1. In the present example, the UE attempts to decode P1$^1$ 305 but fails. The UE therefore stores the soft symbols for P1$^1$ 305 and refrains from sending an acknowledgement or negative acknowledgement 310 via the uplink channel (for example the PUSCH or PUCCH). The UE also stores the soft symbols for D1$^1$ 307 for use in future combining.

The eNB, failing to receive an acknowledgement or negative acknowledgement 310 within an expected time range, infers that the UE has failed to decode P1$^1$ 305. A second attempt follows. The eNB transmits another message P1$^2$ 315 to the UE over the PDCCH, as well as a message D1$^2$ 317 to the UE over the PDSCH. The message D1$^2$ 317 may be a differently encoded copy of D1$^1$ 307. The two messages P1$^2$ 315 and D1$^2$ 317 are again transmitted in the same sub-slot. The message P1$^2$ 315 may be encoded differently than the message P1$^1$ 305, in order that the subsequent combination of messages corresponds to more than a simple repetition code. In the present example, the UE attempts to decode P1$^2$ 315 but fails. Additionally, the UE combines the messages P1$^1$ 305 and P1$^2$ 315 and attempts to decode the combination, but decoding of the combination also fails. The UE therefore stores the soft symbols for P1$^2$ 315 and refrains from sending an acknowledgement or negative acknowledgement 320 via the uplink channel. The UE also stores the soft symbols for D1$^2$ 317 for use in future combining.

Once more, the eNB, failing to receive an acknowledgement or negative acknowledgement 320 within an expected time range, infers that the UE has failed to decode P1$^1$ 305 and P1$^2$ 315. A third attempt follows. The eNB transmits another message P1$^3$ 325 to the UE over the PDCCH, as well as a message D1$^3$ 327 to the UE over the PDSCH. The message D1$^3$ 327 may be encoded differently from D1$^1$ 307 and D1$^2$ 317. The two messages P1$^3$ 325 and D1$^3$ 327 are again transmitted in the same sub-slot. The message P1$^3$ 325 may be encoded differently than the messages P1$^1$ 305 and P1$^2$ 315, in order that the subsequent combination of messages corresponds to more than a simple repetition code. In the present example, the UE attempts to decode $P1^3$ 325 but fails. Additionally, the UE combines the messages $P1^2$ 315 and $P1^3$ 325 and attempts to decode the combination, but decoding of the combination also fails. Finally, the UE combines the messages $P1^1$ 305, $P1^2$ 315 and $P1^3$ 325 and successfully decodes the combination. At this point the UE also combines the messages $D1^1$ 307, $D1^2$ 317 and $D1^3$ 327 and decodes the combination. The UE transmits an acknowledgement if the combined decoding of $D1^1$ 307, $D1^2$ 317 and $D1^3$ 327 is successful or a NACK if it is not 330 via the uplink channel. The eNB receives the acknowledgement or NACK 330 and stops sending copies of the DL grant message if the response is an ACK.

Example 4

In Example 2, PUSCH resources may be wasted when the UE is not able to decode the PDCCH UL grant on the first two attempts. The wasted resources correspond to the "silent" instances 210 and 220 where no data is sent on the PUSCH, since these instances consume resources which could have been allocated for use by other UEs. To alleviate this, the eNB may use PDCCH TTI bundling where the eNB may be configured to predict approximate coverage and thus the number of PDCCH copies or PDCCH TTI bundles the UE will require in order to successfully decode the PDCCH UL grant message. The UE would then not allocate corresponding PUSCH resources for all but the last PDCCH copy. For example if the eNB predicts that it will likely take at least 3 copies of the PDCCH UL grant message for the UE to successfully decode, it doesn't have to allocate the PUSCH resources for the first two copies. The eNB may further be configured to ensure that the first two copies of the PDCCH UL grant message are not decodable (even if received with no errors) by the UE. This may result in avoiding a situation in which the UE uses PUSCH resources which are not really assigned to it. For example, rendering the first two copies using a simple block code across the 3 PDCCH UL grant messages could be done to make the first two copies un-decodable by the UE.

Figure 4:
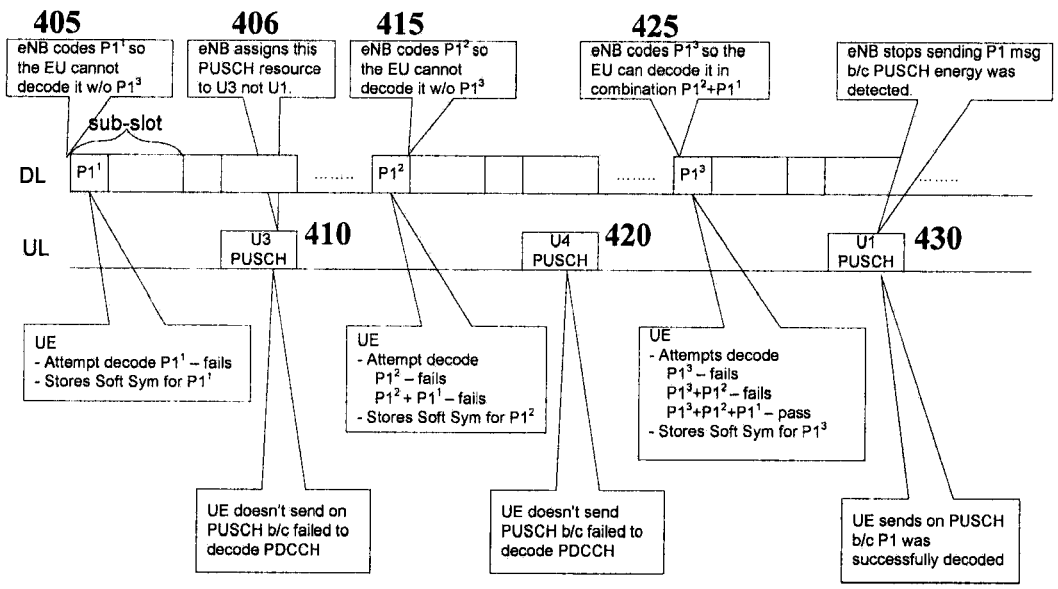
FIG. 4 illustrates transmission of an UL grant using blind combining HARQ and an initial plurality of copies of the UL grant, in accordance with one embodiment of the technology.

FIG. 4 illustrates an example of an uplink (UL) grant (such as an uplink shared channel resource allocation) being communicated to a UE in accordance with an embodiment of the present technology. The UL grant message is transmitted three times on the PDCCH, as follows. The three transmissions are unconditional since the UE will not be able to successfully decode the PDCCH UL grant message the first two times, due to message encoding as well as expected signal conditions. The eNB transmits an initial message $P1^1$ 405 to the UE over the PDCCH and in another UL grant (not shown) assigns and allocates 406 the resources 410 of PUSCH to another UE. In the present example, the UE attempts to decode $P1^1$ 405 but fails. The UE therefore stores the soft symbols for $P1^1$ 405 and refrains from sending data 410 via the uplink channel (for example the PUSCH). As noted above, the time and frequency resources corresponding to the instance 410 (where data from the UE would normally have been transmitted) are assigned by the eNB for use by another UE.

A second attempt follows, regardless of whether or not the eNB performs or omits a pro forma inference step (of inferring that the UE has not correctly decoded the message $P1^1$ due to lack of acknowledgement). The eNB transmits another message $P1^2$ 415 to the UE over the PDCCH and in another UL grant (not shown) assigns and allocates the resources 420 of PUSCH to another UE. The message $P1^2$ 415 is encoded differently than the message $P1^1$ 405, in order that the subsequent combination of messages corresponds to more than a simple repetition code. The message $P1^2$ 415 is encoded in such a manner that the UE cannot decode $P1^2$ on its own or solely in combination with $P1^1$. In the present example, the UE attempts to decode $P1^2$ 415 but necessarily fails. Additionally, the UE combines the messages $P1^1$ 405 and $P1^2$ 415 and attempts to decode the combination, but decoding of the combination also necessarily fails. The UE therefore stores the soft symbols for $P1^2$ 415 and refrains from sending data 420 via the uplink channel. As noted above, the time and frequency resources corresponding to the instance 420 (where data from the UE would normally have been transmitted) are assigned by the eNB for use by another UE.

A third attempt follows, regardless of whether or not the eNB performs or omits a pro forma inference step. The eNB transmits another message $P1^3$ 425 to the UE over the PDCCH and allocates the resources 430 to the UE. The message $P1^3$ 425 is encoded differently than the messages $P1^1$ 405 and $P1^2$ 415, in order that the subsequent combination of messages corresponds to more than a simple repetition code. The message $P1^3$ 425 is encoded in such a manner that the UE cannot decode $P1^3$ on its own or solely in combination with $P1^2$, but the UE can decode $P1^3$ in combination with both $P1^1$ and $P1^2$. In the present example, the UE attempts to decode $P1^3$ 425 but necessarily fails. Additionally, the UE combines the messages $P1^2$ 415 and $P1^3$ 425 and attempts to decode the combination, but decoding of the combination also necessarily fails. Finally, the UE combines the messages $P1^1$ 405, $P1^2$ 415 and $P1^3$ 425 and successfully decodes the combination. The UE transmits data 430 via the uplink channel. The eNB receives the data 430 and stops sending copies of the UL grant message.

From the perspective of the UE, Example 4 is identical to Example 2. However, from the perspective of the eNB, the two examples are different, since the eNB instead assigns the corresponding resources 410 and 420 for use by one or more other UEs.

Other variations on the above example may be provided. For example, a sliding window concept may be used for transmitting sets of messages without acknowledgements. Similarly, the process of Example 4 may be adapted in order to save resources on the PDSCH. As another example, the features of Examples 3 and 4 can be combined.

Example 5

Figure 5:
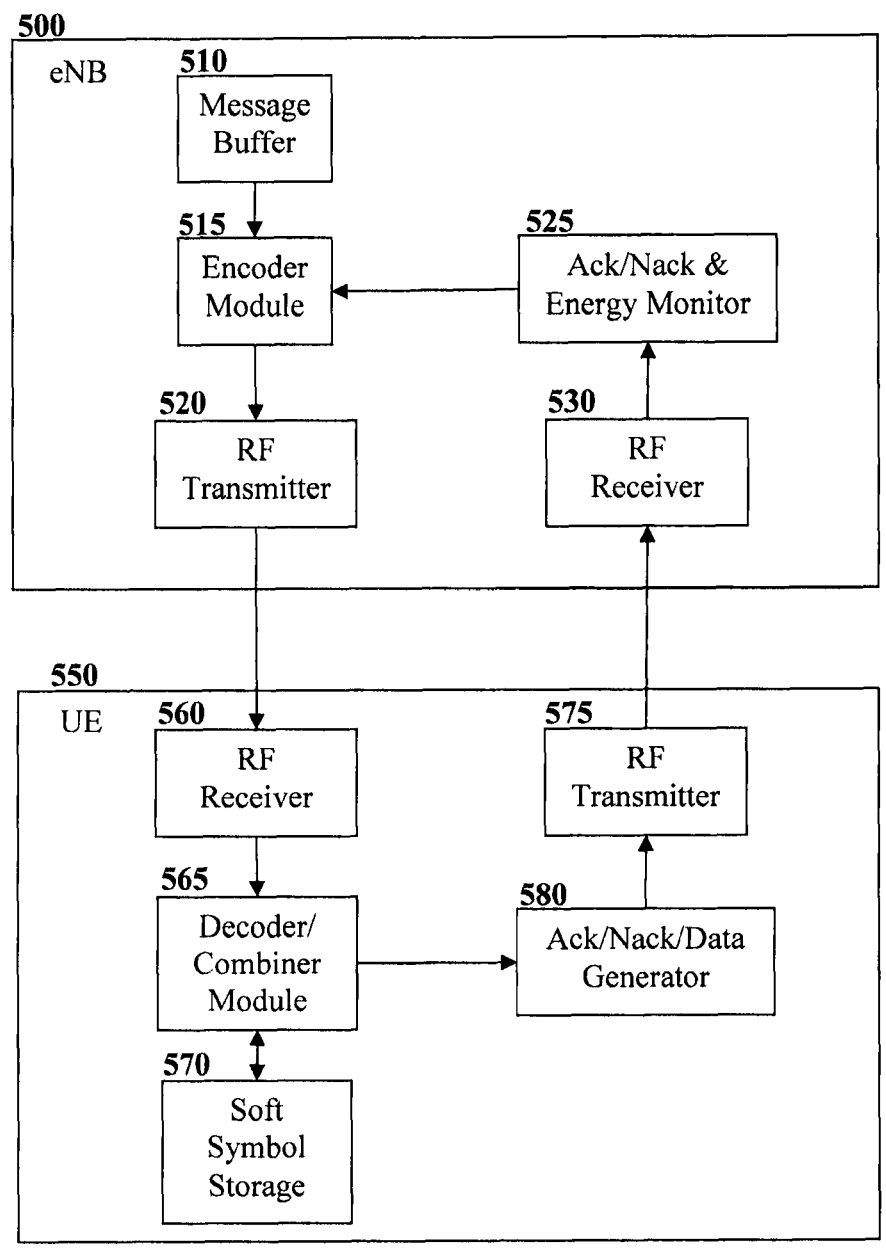
FIG. 5 illustrates a system provided in accordance with embodiments of the technology.

FIG. 5 illustrates a system provided in accordance with an embodiment of the present technology. The system comprises a base station 500, such as a LTE eNB in wireless communication with UEs within a service area. In particular, the eNB is in wireless communication with a UE 550. The eNB comprises a message buffer 510 for holding messages, such as downlink control messages to be communicated via a control channel (e.g. the PDCCH) using the blind combining HARQ mechanism as described herein. The message in the message buffer 510 is passed to and encoded by an encoder module 515. The encoded message is passed to an RF transmitter 520 of the eNB.

An RF receiver 530 receives messages from the UE 550 and an ACK/NACK/Energy monitor 525 monitors the received messages for acknowledgements (positive or negative) and/or energy within a UL resource block (e.g. on the PUSCH). The ACK/NACK/Energy monitor 525 may be configured to monitor only those LTE resources (for example resource blocks in time and frequency) where an acknowledgement or RF energy is expected. If an acknowledgement or RF Energy is not received from the UE in an expected time range and frequency band, then the ACK/NACK/Energy monitor 525 triggers the encoder module 515 to provide another copy of the message for retransmission in a predetermined time & frequency known to the UE. This retransmission may occur a predetermined number of times, up to a retransmission limit. In various embodiments, each new copy of the message may be encoded differently, for example using incremental redundancy encoding or another encoding method as is readily known to a worker skilled in the art. In some embodiments, if the UE is not expected to be able to decode the message, due to deliberate encoding of the message to require multiple copies for decoding, the encoder module 515 may be configured to retransmit the message a predetermined number of times even without prompting from the ACK/NACK/Energy monitor 525 and without allocating certain shared resources (e.g. on the PDSCH or PUSCH).

The UE 550 comprises an RF receiver 560 which is configured to receive copies of the grant messages transmitted by the RF transmitter 520 of the eNB 500. The UE further comprises a decoder/combiner module 565 configured to attempt to decode the received grant messages, and to combine plural copies of a grant message and to attempt to decode the combination. If a copy of a grant message cannot be decoded, either on its own or in combination with other previously received copies of that grant message, the currently received copy of the grant message may be stored in soft symbol storage memory 570. When later combining plural copies of a grant message, previously stored copies of the grant message may then be retrieved from soft symbol storage 570 by the decoder/combiner module. Previously received messages may be stored independently or in aggregate. In one embodiment, soft symbol storage 570 may use or share the existing PDSCH HARQ soft symbol storage, which may be available since the PDCCH assigns resources to the PDSCH. If a grant message can be correctly decoded, either on the basis of a currently received copy of the grant message or a combination of plural received copies of the grant message, then the decoder/combiner module 565 triggers decoding of the PDSCH or sending of uplink data on the PUSCH. The ACK/NACK/Data generator 580 generates an acknowledgement or uplink data and forwards same to the RF transceiver 575. The RF transceiver then transmits the acknowledgment or data to the RF receiver 530.

Additional Details

In some embodiments, a combination of PDCCH TTI bundling and blind combining HARQ is provided, thereby leveraging the advantages of both methods. As mentioned, PDCCH TTI bundling may result in more efficient use of PUSCH or PDSCH resources, while blind combining HARQ may result in dynamic gain to the PDCCH so that if the initial PDCCH TTI bundle fails, the entire PDCCH TTI bundle does not need to be sent again.

In some embodiments, the following may be employed to support PDCCH TTI bundling:

In some embodiments, timing, (for example an LTE sub-frame number or system frame number or both) may be added to the downlink control message, such as DCI messages. Currently the PDCCH DCI messages do not include time information of when the resource is assigned (to minimize bits in DCI message). The timing is relative to the reception time of the PDCCH message (i.e. for PDSCH grants it is the current sub-frame and for PUSCH grants it is 4 sub-frames). Timing may thus be added to the DCI message, thereby allowing the UE to know when the PRB is assigned. For example, if the UE were to successfully decode the DCI upon receipt of the 2nd copy, but the PDCCH TTI bundle size is equal to 3, the UE would know to wait one more PDCCH cycle before trying to decode the PDSCH resources. Adding the LTE sub-frame number concatenated with the system frame number (or optionally the lower bits) to the DCI message would provide the UE the timing information and would allow for potentially large PDCCH TTI bundle sizes given the system frame number (SFN) repeats every 10.25 seconds. The sub-frame number ranges from 0 to 19 (5 bits) and SFN is a 10 bit number thus 15 bits would be added to the DCI message. If all of the PDCCH copies in the PDCCH TTI bundle can be sent in less than 10.25 seconds, then only the least significant bit of the SFN would need to be added to the DCI message (for example, if all the PDCCH copies could be sent in 1.28 seconds, then only the 6 least significant bits (1.28 s/20 msec) of the SFN plus the 5 bits of the sub-frame number would need to be included in the DCI message. If the PDCCH copies are sent every $8^{th}$ sub-frame (8 msecs), the 1.28 second period would allow a maximum PDCCH TTI bundle size of 160 (1.28 s/8 msec).

In some embodiments, a new higher layer signaling may be utilized, (for example piggy backed on existing RRC messages). Signalling may be sent from the eNB to UE (if the eNB decides the bundling size) or from the UE to the eNB (if the UE decides the bundling size) to indicate the PDCCH TTI bundling size. Additional overhead may be required for the above.

In some embodiments, PDCCH TTI Bundle Size may be added to a PDCCH Message. The eNB may add the bundle size to the PDCCH message so the UE would know to combine at least the bundle size number of PDCCH.

In some embodiments, the channel quality indicator (CQI) may be used to support PDCCH TTI bundling. The UE already sends a CQI value to eNB. The TTI bundling size may be inferred (e.g. looked up in a table) by the CQI value the UE sends to the eNB. If the CQI is not sent, for example when the UE is idle, the eNB may be configured to request an asynchronous CQI report.

In some embodiments, an existing power overhead message may be used to support bundling. Similar to CQI, the UE currently sends a power overhead message to the eNB indicating remaining TX power room. The TTI bundling size can be inferred (e.g. looked up in a table) by the power overhead level the UE sends to the eNB.

In some embodiments, the UE and eNB are configured to set the TTI bundle size based on the number of combines it took to decode the most recently successful decode of a PDCCH message (e.g. if it took 8 combines on last PDCCH, the PDCCH TTI bundle size (8−2)=6). Since both the UE and eNB know how many copies it took to decode, they should both be in sync.

In some embodiments, so that the UE doesn't decode the PDCCH before the complete TTI bundle has been sent, the eNB may be configured to weaken the code of the all but the last PDCCH message so the UE could not decode it without the last copy.

In some embodiments, the eNB may be configured to code the PDCCH differently (e.g. different coding or interleaving) when using TTI bundling so that the UE would need all blocks to decode it. Since the UE would not know a priori which way the eNB coded the blocks (i.e. using IR or some different code across all the PDCCH blocks), the UE would have to blindly attempt to decode every PDCCH using both decoding techniques.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method for facilitating communication between an Evolved Node B (eNB) and a user equipment (UE) in a Long Term Evolution (LTE) system, the method comprising:
   transmitting a downlink control message from the eNB to the UE over a downlink control channel;
   determining an initial number of copies of the downlink control message to transmit, wherein said initial number of copies is determined based on measured channel conditions;
   encoding each of said initial number of copies differently such that the UE is required to combine at least some of the initial number of copies in order to decode the downlink control message;
   retransmitting one or more of the initial number of copies of the downlink control message from the eNB to the UE over the downlink control channel in accordance with a determined downlink control message decoding status of the UE;
   receiving and storing the transmitted downlink control message and the retransmitted one or more initial number of copies of the downlink control message at the UE;
   decoding using a combination of at least some of the transmitted downlink control message and at least some of the retransmitted one or more initial number of copies of the downlink control message at the UE;
   wherein said initial number of copies equals a predicted number of copies required by the UE to decode the downlink control message upon combination of said copies;
   wherein the downlink control message comprises a downlink (DL) grant message;
   transmitting a further message from the eNB to the UE over the physical downlink shared channel (PDSCH) in a same sub-slot as the DL grant message, and
   retransmitting copies of the further message in the same sub-slot as said retransmitted one or more copies of said downlink control message comprising the DL grant message.

2. The method of claim 1, wherein each of the transmitted downlink control message and the retransmitted one or more initial number of copies of the downlink control message is transmitted using a schedule known to the UE.

3. The method of claim 1, wherein the downlink control message decoding status of the UE is determined by the eNB upon detecting absence of an acknowledgement or negative acknowledgement of the data channel transmitted from the UE.

4. The method of claim 1, wherein each of the transmitted further message and the retransmitted copies of the further message are encoded differently.

5. The method of claim 1, wherein the eNB refrains from monitoring for acknowledgements, negative acknowledgements, channel energy, or a combination thereof from the UE until after the initial number of copies of the downlink control message have been transmitted.

6. The method of claim 1, wherein the eNB refrains from allocating a dedicated resource for the UE until after the initial number of copies of the downlink control message have been transmitted.

7. A system comprising an Evolved Node B (eNB) and a user equipment (UE) in a Long Term Evolution (LTE) system, wherein the system is configured to:
   transmit a downlink control message from the eNB to the UE over a downlink control channel;
   determine an initial number of copies of the downlink control message to transmit, wherein said initial number of copies is determined based on measured channel conditions;
   encode each of said initial number of copies differently such that the UE is required to combine at least some of the initial number of copies in order to decode the downlink control message;
   retransmit one or more of the initial number of copies of the downlink control message from the eNB to the UE over the downlink control channel in accordance with a determined downlink control message decoding status of the UE;
   receive and store the transmitted downlink control message and the retransmitted one or more initial number of copies of the downlink control message at the UE;
   decode using a combination of at least some of the transmitted downlink control message and at least some of the retransmitted one or more initial number of copies of the downlink control message at the UE;
   wherein said initial number of copies equals a predicted number of copies required by the UE to decode the downlink control message upon combination of said copies;
   wherein the downlink control message comprises a downlink (DL) grant message;

transmit a further message from the eNB to the UE over the physical downlink shared channel (PDSCH) in a same sub-slot as the DL grant message, and retransmit copies of the further message in the same sub-slot as said retransmitted one or more copies of said downlink control message comprising the DL grant message.

8. The system of claim 7, wherein each of the transmitted downlink control message and the retransmitted one or more copies of the downlink control message is transmitted using a schedule known to the UE.

9. The system of claim 7, wherein the downlink control message decoding status of the UE is determined by the eNB upon detecting absence of an acknowledgement or negative acknowledgement of the data channel transmitted from the UE.

10. The system of claim 7, wherein each of the transmitted further message and the retransmitted copies of the further message are encoded differently.

11. The system of claim 7, wherein the eNB is configured to refrain from monitoring for acknowledgements, negative acknowledgements, channel energy, or a combination thereof from the UE until after the initial number of copies of the downlink control message have been transmitted.

12. The system of claim 7, wherein the eNB is configured to refrain from allocating a dedicated resource for the UE until after the initial number of copies of the downlink control message have been transmitted.

13. A computer program product comprising a non-transitory computer readable medium storing computer executable statements and instructions thereon that, when executed by a computer, perform operations for facilitating communication between an Evolved Node B (eNB) and a user equipment (UE) in a Long Term Evolution (LTE) system, the operations comprising:
  transmitting a downlink control message from the eNB to the UE over a downlink control channel;
  determining an initial number of copies of the downlink control message to transmit, wherein said initial number of copies is determined based on measured channel conditions;
  encoding each of said initial number of copies differently such that the UE is required to combine at least some of the initial number of copies in order to decode the downlink control message;
  retransmitting one or more of the initial number of copies of the downlink control message from the eNB to the UE over the downlink control channel in accordance with a determined downlink control message decoding status of the UE;
  receiving and storing the transmitted downlink control message and the retransmitted one or more initial number of copies of the downlink control message at the UE;
  decoding using a combination of at least some of the transmitted downlink control message and at least some of the retransmitted one or more initial number of copies of the downlink control message at the UE;
  wherein said initial number of copies equals a predicted number of copies required by the UE to decode the downlink control message upon combination of said copies;
  wherein the downlink control message comprises a downlink (DL) grant message;
  transmitting a further message from the eNB to the UE over the physical downlink shared channel (PDSCH) in a same sub-slot as the DL grant message, and
  retransmitting copies of the further message in the same sub-slot as said retransmitted one or more copies of said downlink control message comprising the DL grant message.

14. The computer program product of claim 13, wherein each of the transmitted downlink control message and the retransmitted one or more copies of the downlink control message is transmitted using a schedule known to the UE.

15. The computer program product of claim 13, wherein the downlink control message decoding status of the UE is determined by the eNB upon detecting absence of an acknowledgement or negative acknowledgement of the data channel transmitted from the UE.

16. The computer program product of claim 13, wherein each of the transmitted further message and the retransmitted copies of the further message are encoded differently.

17. The computer program product of claim 13, wherein the eNB refrains from monitoring for acknowledgements, negative acknowledgements, channel energy, or a combination thereof from the UE until after the initial number of copies of the downlink control message have been transmitted.

18. The computer program product of claim 13, wherein the eNB refrains from allocating a dedicated resource for the UE until after the initial number of copies of the downlink control message have been transmitted.

* * * * *